United States Patent

[11] 3,550,727

| [72] | Inventor | Glendell R. McCain<br>Amarillo, Tex. |
|---|---|---|
| [21] | Appl. No. | 778,660 |
| [22] | Filed | Nov. 25, 1968 |
| [45] | Patented | Dec. 29, 1970 |
| [73] | Assignee | Amarillo Gear Company<br>Amarillo, Tex. |

[54] SLIP COUPLING AND ONE-WAY BRAKE FOR IRRIGATION PUMP
2 Claims, 12 Drawing Figs.

[52] U.S. Cl............................................. 188/82.9,
64/30; 103/87; 192/7, 192/8
[51] Int. Cl.................................................... F16d 41/04
[50] Field of Search........................................... 192/12B, 7,
8; 188/82.9

[56] References Cited
UNITED STATES PATENTS

| 1,663,226 | 3/1928 | Wintroath | 188/82.9X |
| 3,367,460 | 2/1968 | Wanner | 192/12BUX |
| 3,448,840 | 6/1969 | Rosin | 192/12BX |
| 3,477,302 | 11/1969 | Webb | 192/12BX |

*Primary Examiner*—Benjamin W. Wyche
*Attorney*—Ely Silverman

ABSTRACT: An irrigation pump system with a slip clutch providing for gradual slowing of the rotation of the pump drive shaft on interruption of power to the pump, the slip clutch therefor comprising a carrier assembly slidably supporting a circular array of vertically movable rigid locking pins over and in contact with a stationary circular array of wedge-shaped detents for free movement of the carrier relative to the array in one direction, and the carrier assembly enclosing a flanged collar that is attached to a vertically elongated pump drive shaft, the locking assembly readily adjustably attached to the flanged collar by resilient and friction elements for controlled slippage relations therebetween.

PATENTED DEC 29 1970
3,550,727
SHEET 1 OF 3
FIG.1
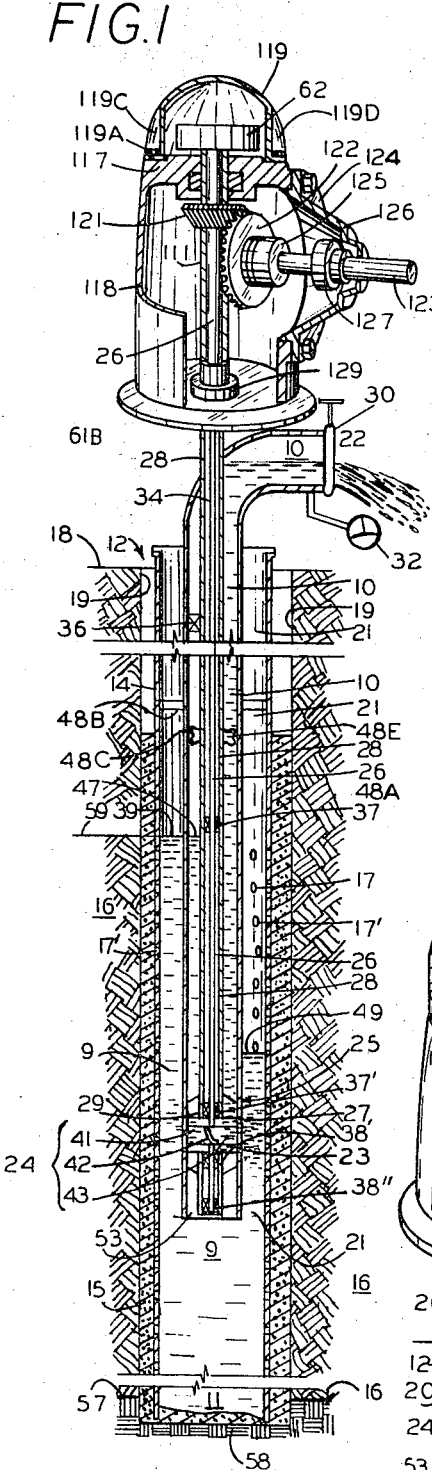
FIG.2
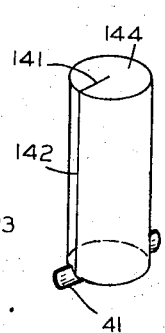
FIG.3
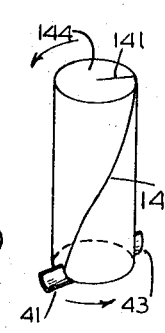
FIG.4 FIG.5
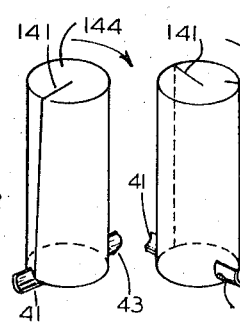
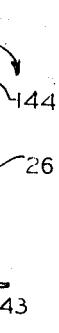
FIG.6
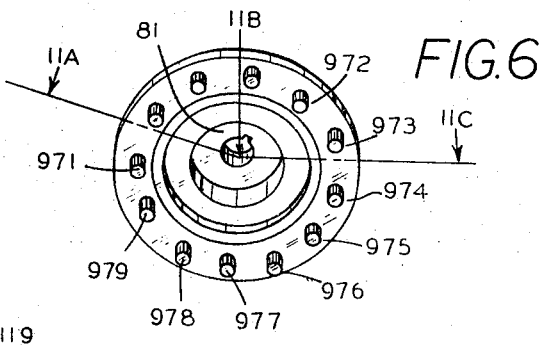
FIG.7
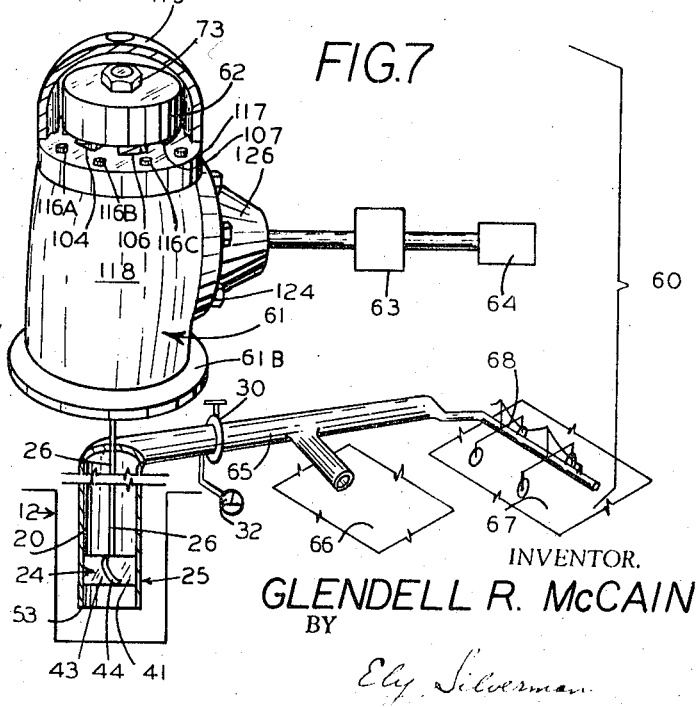
INVENTOR.
GLENDELL R. McCAIN
BY
Ely Silverman
ATTORNEY

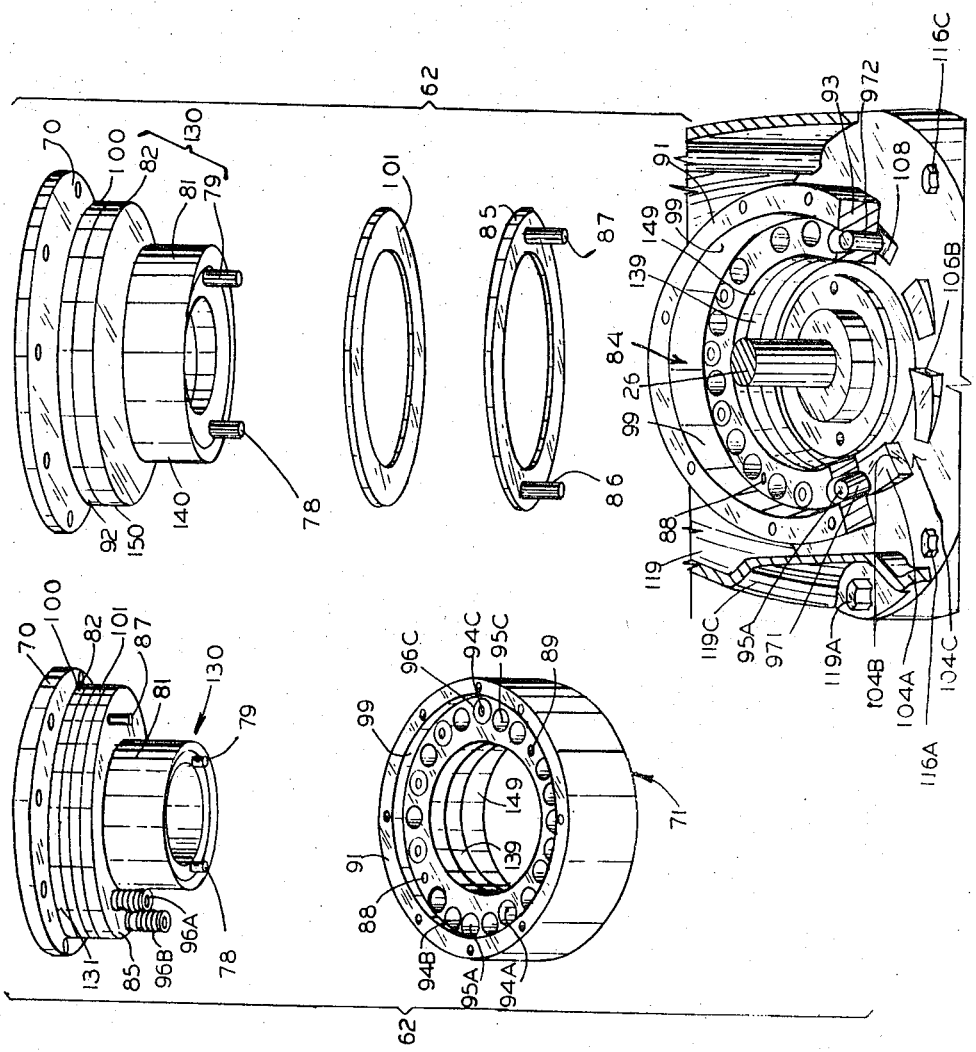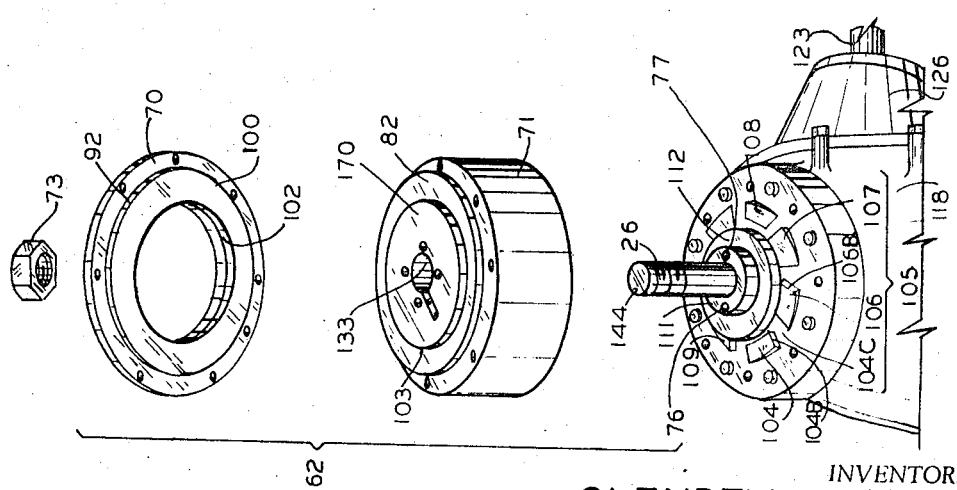

INVENTOR.
GLENDELL R. McCAIN
BY
Ely Silverman
ATTORNEY

3,550,727

SLIP COUPLING AND ONE-WAY BRAKE FOR IRRIGATION PUMP

BACKGROUND OF THE INVENTION

1. Field of the Invention

The Field of art to which this invention pertains are fluid-pumping and dispensing systems and torque-responsive yielding clutches and brakes with check of drive member.

2. Description of the Prior Art

In usual high-pressure, deep well irrigation pump systems, sudden release of connection of the downwell pump to its driving motor, the usual mechanisms for allowing only one-way rotation of the pump in low-pressure and shallow wells are destroyed with concomitant damage to the bearings in the well and elements of the driving motors.

SUMMARY OF THE INVENTION

Close analysis for the reason for failure of the conventional one-way ratchet and pawl apparatuses used in irrigation systems shows that, with a one-way pawl unit that permits pump rotation in only one (e.g. counterclockwise) direction for discharge of well water to the to-be-irrigated fields, on release of connection to its engine, the pump is urged by the water column thereabove and water distribution system connected therewith operating on the faces of the impeller pump to not turn any further in one, counterclockwise, direction; with the thus fixed faces of the pump impeller as a base, the shaft, being to a degree a wound-up spring, then rapidly and forcefully tends to and does rotate at its top in the opposite, clockwise, direction and causes a usual locking pin or pawl to strike a fixed ratchet face with such considerable force, that, in other than an apparatus prepared according to this invention, destroys such pawls or pins; however, by the apparatus of this invention that sharp impact is greatly softened because its springs are so arranged that the shaft does not rotate so rapidly but is initially very much slowed down to a nondamaging speed and then rotates, more slowly, over a substantial number (7 to 10) of revolutions over a period of 5 to 10 seconds to safely relieve the stresses in the shaft and system. The 1½ unit is arranged to provide full transmittal of torque with only elastic deformation in one direction, and automatic yield when such torque is applied in the other direction and, further, provide for ready disassembly and adjustment to meet the particular situation of any particular system and, also, changes in the requirements of that system.

A BRIEF DESCRIPTION OF THE DRAWINGS

FIG. 1 is an overall partially diagrammatic and partially broken-away view of the well, pump and drive assembly in which the slip clutch of this invention is operative and wherein the diagrammatic vertical longitudinal cross-sectional view of an irrigation well is shown in the lower left side thereof with its water level as in the resting phase of its cycle of operation and is shown on the lower right side of that figure with the water level therein as in the discharge phase of its cycle of operation.

FIGS. 2, 3, 4 and 5 diagrammatically show relations of shaft in the system 60 during certain below-discussed phases of the operation thereof.

FIG. 6 is a perspective view showing the bottom of the slip clutch unit of the invention herein.

FIG. 7 is a diagrammatic overall view of an irrigating system and shows, in perspective, the slip clutch assembly 62 on the drive unit 61, its cover 119 broken away, within such system.

FIG. 8 is a perspective partially exploded view showing the cover plate 70 separated from the remainder of slip clutch assembly 62 and the location of parts connecting to assembly 62 on the body of the drive unit therefor.

FIG. 9 is an exploded perspective view of the interior of assembly 62 more disassembled than in FIG. 8 and showing some spring and pin elements contacting bottom of support plate 85.

FIG. 10 is a further exploded view of assembly 62 with elements as 85 and 80 separated from each other and from the locking casing unit body, member 71, shown partly in section to show some details thereof relative to the detent plate on the drive unit 61.

FIG. 11 is drawn so as to illustrate quantitative relations of sizes of elements in and in direct contact with assembly 62.

Figure 11:
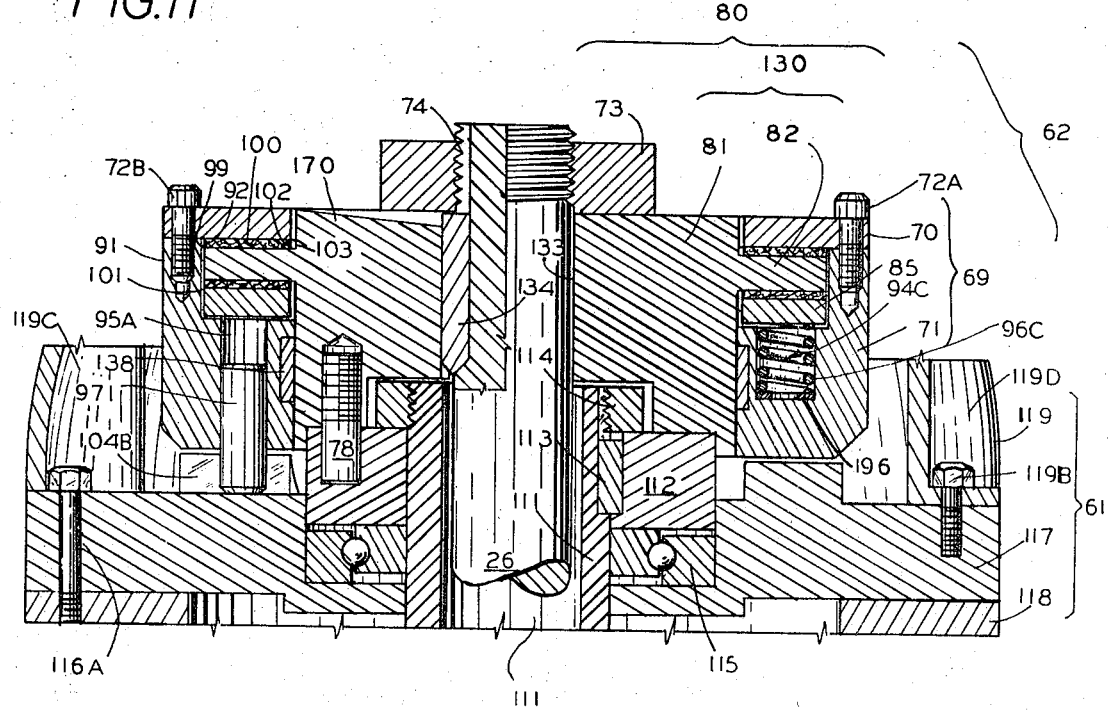
FIG. 11 is a diagrammatic vertical cross-sectional view across continuous radial planes 11A–11B and 11B–11C of FIG. 6.

FIGS. 7, 8, 10 show the direction of upward slope of the upwardly sloped faces of array 105 to be counterclockwise as seen from above, which direction is the direction of rotation of assembly 62 in unit 61 when motor 64 is driving pump assembly 27 of FIG. 1 to drive water upward of line 20 and through the distribution system of FIG. 7.

Table I is a tabular representation of typical relationships for the adjustment of the apparatus of this invention shown in FIGS. 1 through 11.

Table II provides adjustment and calibrating data for another embodiment of the invention.

DESCRIPTION OF THE PREFERRED EMBODIMENT

The system 60 of this invention comprises, in operative combination, well 12, a pump 27 and its pump shaft 26, a discharge line as 20, a right-angle drive unit 61, a slip clutch assembly therefor 62, a motor 64, a water distribution line 65, a plurality of fields such as 66, and 67 and means for distributing the water over the field, as an irrigator 68.

The well 12 comprises an imperforate vertically elongated cylindrical metal casing 14 extending upwardly from near the bottom 11 of the well 12, which bottom is below the bottom of the water-producing formation 16, to the ground surface 18. A conventional gravel pack 15 fills the annular space between the cylindrical well wall 19 and the outside of the casing 14. Casing 14 is perforated adjacent the formation 16 by numerous conventional perforations as 17, 17' and 17". Within cylindrical casing 14, which has a relatively large internal diameter (e.g. 16") is discharge line 20 of substantially small diameter (e.g. 6"). Discharge line 20 is a vertical string of serially connected hollow cylindrical imperforate sections of tubing or pipe. Discharge line 20 terminates at its top in an upper discharge outlet 22 usually above the-ground surface 18, and at its bottom has a lower inlet opening 53 below the upper level, 59, of the top of water-producing formation 16. A vertically elongated annular casing chamber 21 is formed between casing 14 and line 20. Brackets as 48A, 48B, 48C, 48D, and 48E space apart items 14, 20 and 28, but do not substantially interfere with the flow of fluid in chambers 10 or 21. The bore as well as well wall 19 of well 12 extends to below the bottom level 57 of the formation 16 into the usual "red bed" 58 therebelow. The gravel pack extends below the bottom of casing 14 to the well bore bottom 11 and fills the bottom 1 to 2 feet of the casing 14 interiorly which bottom is far below inlet 53 to cavity 29 for the pump impeller blade.

A conventional pump assembly, 27, located near the bottom of line 20 comprises a conventional impeller blade housing 25 with impeller blade housing cavity 29 therein, housing the impeller 24 therein. Impeller 24 comprises a plurality of blades as 41, 42, 43, 44 and is firmly yet rotatably supported on and driven by a vertically extending steel drive shaft 26. Pump housing 25 is supported by and attached to the bottom of discharge line 20; shaft 26 is driven through a conventional motor 64, (frequently also through a conventional clutch as 63), a drive unit 61 and a slip clutch assembly 62 and is located in a vertical cylindrical chamber 34 in vertically extending imperforate cylindrical metal drive shaft housing 28 and is rotatably mounted in bearings as 36, 37, 37', 38, 38' and 38" which are supported on drive shaft housing 28.

An annular discharge line chamber 10 extends within line 20 from pump assembly 27 to discharge outlet 22 between housing 28 and the interior of line 20 and connects via inlet 23 to cavity 29.

When the motor does not drive the pump impeller, and the well is in its "resting" phase, (left part of FIG. 1) the water, 9, passes from formation 16 through the gravel pack 15 and the perforations, as 17, 17' and 17" in wall 14, and enters chamber 21 and rises to the level 39 in casing chamber 21, and the water also rises in chambers 10 and 34 to level 47, which is the same vertical height or level as 39. On operation of the motor 31 and pump assembly 27, the impeller 24 drives the water in chamber 10 upward and out from outlet 22: concurrently the level of water in chambers 21 and 34 fall from level 39 to a lower level, as 49, substantially above the vertical height or level of the top of the pump impeller 24; more water is then pumped into chamber 10 via inlet 53 from chamber 21 and formation 16. When the operation of motor 64 and impeller 24 cease the level of the column of water in chamber 10 falls to level 47 by passing against and past the impeller blades of assembly 24 then through the opening 53, and then to chamber 21.

In the system 60 a motor 64 is operatively attached to and powers the drive unit 61; the drive unit 61 is operatively connected via a slip clutch 62 to a pump shaft 26 and thereby to the pump 27. A discharge line 20 from the pump 27 in a well 12 is operatively connected to a water distribution line, 65, so as to pass the water, 9, from the pump 27 in the well 12 to fields as 66 and 67 and an irrigating machine thereon as 68.

The slip clutch unit 62 comprises a hollow locking case unit 69 and a flanged drive sleeve unit 80. The hollow locking case unit 69 comprises a circular flat rigid cover plate 70 with a rigid hollow locking case body member 71. The member 71 and the cover plate 70 are firmly connected together by like threaded bolts as 72A and 72B to form and enclose a cylindrical locking case unit chamber 84. The shaft 26 for the conventional pump assembly 27 is firmly attached to and supported by a nut 73, which nut is firmly attached to a threaded portion 74 of the shaft 26 and the bottom surface of the nut rests on the top of unit 80 and projects above the top of the plate 70.

Drive unit 61 comprises a rigid vertical cylindrical steel main housing 118, a cover plate 117 with a central bearing 115 supported therein, a dome-shaped cover 119; a hollow vertical drive sleeve 111, a case-hardened alloy steel bevel gear 121 firmly fixed on vertical sleeve 111, a mating gear 122 located on a horizontal drive shaft 123. Gears 122 and 123 are spiral bevel gears. A main bearing 125 is firmly located in housing 118. An auxiliary rigid housing 126 is firmly attached as by bolts 124 to main housing 118 and supports an auxiliary bearing 127. Shaft 123 is horizontal and rotatably supported in bearings 127 and 125 and is firmly attached to gear 122.

The housing 118 is firmly yet removably affixed to the cover plate 117 as by bolts 116A, 116B and 116C. Bearing 115 is located in the center of plate 117; an imperforate cover 119 is removably yet firmly attached to the periphery of plate 117. Sleeve 111, shaft 26 and bearing 115 are coaxial. Bevel gear 121 is firmly fixed to sleeve 111, which is rotatably mounted in upper and lower bearings 115 and 129. Shaft 123, driven by motor 64, is rotatably located in bearings 125 and 127. Cover plate 117 is a rigid circular plate attached at its edge to housing 118 and bolts as 119A and 119B hold cover 119 thereto.

The flanged drive sleeve unit 80 comprises a central rigid vertical cylindrical drive sleeve 111, a peripheral coaxial rigid annular drive shoulder 112, a key 113 therebetween (the key connecting the shoulder and sleeve), a nut 114, a flanged collar unit 130 and pins 78 and 79. The key 113 connects the shoulder and sleeve; the nut is attached to a threaded portion of the sleeve 111, the cylindrical interior of sleeve 111 forms only a loose fit with shaft 26 but is firmly coaxial therewith. The shoulder 112 is rotatably supported on a coaxial annular roller bearing 115 in the cover plate 117 of the drive unit 61; the upper face of drive sleeve shoulder 112 is provided with vertical cylindrical holes 76 and 77 diametrically spaced apart and of equal depth and diameter for pins or studs 78 and 79.

The collar unit 130 has a central vertically elongated annular sleeve 81 and a peripheral horizontally elongated annular flange or shoulder portion 82 firmly joined together, portion 81 has a central vertical cylindrical hollow passage 133 therethrough; while shaft 26 forms a loose fit therethrough, it is coaxial therewith and firmly fixed to the collar 130 as by key 134 and nut 73; nut 73 is attached to the upper threaded portion 74 of shaft 26, rigid vertically extending strong steel cylindrical pins 78 and 79 are firmly fixed to the bottom of collar 130. The cover plate portion 170 of sleeve 81 extends above the top of plate 82 to the top of cover plate 70.

Figure 12:
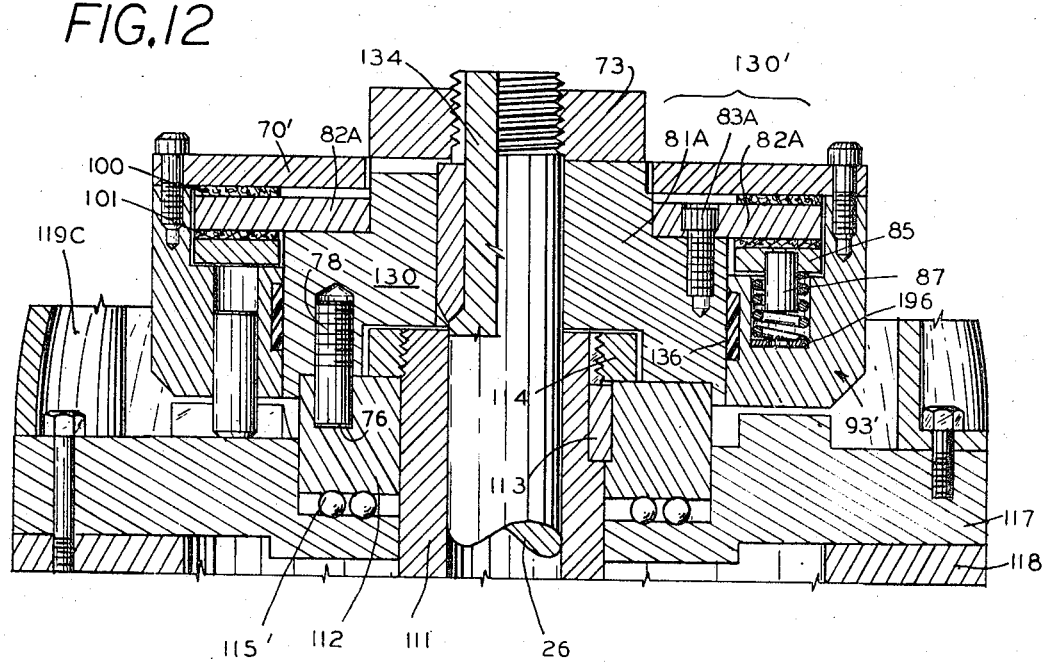
FIG. 12 is a view as in FIG. 11 of another embodiment of the slip clutch shown as in FIG. 11.

The annular collar unit 130 is thus generally shaped as a "top hat" and below referred to as a "top hat" element unit; the rigid pins 78 and 79 firmly attached thereto and projecting therefrom locate in and remove from the holes 76 and 77, respectively, of shoulder 112. While the "top hat" unit 130 comprises the annular sleeve element 81 and an annular shoulder or flange plate 82 which are firmly attached together to form one rigid unit, the elements 81 and 82 may be made separately as 81A and 82A respectively as shown in FIG. 12 and then held together by a plurality of bolts as 83A as shown in FIG. 12 to form a unit 130' and vertically elongated synthetic plastic bearing ring 136 is located in body 93' (corresponding to body 93 of unit 69). The top and bottom surface of plate 82 are flat and parallel.

The casing body member 71 is formed of a rigid vertically elongated hollow cylindrical wall portion 91 and, firmly attached on the interior thereof a coaxial annular circular body or block portion 93. The block portion 93 is provided with a plurality of like axially extending right cylindrical holes as 95A, 95B and 95C, in each of which is slidably located a rigid solid cylindrical clutch pin 971, 979 and 973 respectively. The holes 95A, 95B and 95C alternate with parallel right cylindrical recesses 94A, 94B and 94C respectively, and are in a circular array. In each of the recesses as 94A, 94B and 94C there may be located a spring as 96A, 96B and 96C respectively. All holes as 95A, 95B and 95C pass entirely through the portion 93 and are all vertical and equally spaced from each other and are arranged with their central vertical axes in a circle coaxial with the plates 82 and 70. The recesses as 94A, 94B and 94C extend from the top of the portion 93 but do not extend all the way through the body 93 and the bottom of each such recess provides seats for springs as 96A, 96B and 96C. The support plate pins as 87 may be loosely located within the cylindrical space defined by the interior of each of the springs as 96A, 96B and 96C as shown in FIG. 12 rather than having a separate hole therefor as 88 and 89 shown in the embodiment of FIG. 9.

An annular thin flat-topped brake shoe support plate 85 is located below and coaxially with the annularly shaped shoulder or flange portion 82 of unit 130 and is provided with rigid vertical pins as 86 and 87 firmly attached thereto that fit into each of a set of recesses as 88 and 89 therefor in the body portion 93 in embodiment shown in FIGS. 5 and 10.

Flat annular brake shoe plate 100 is located between the top of shoulder as 82 and the bottom of plate element 70 respectively. The inner vertical cylindrical surface 102 of that plate 100 is very slightly but definitely spaced away from the outer cylindrical surface 103 of collar portion 81 sufficient to form a very loose sliding fit therewith, i.e. ≈ 0.005 inch; outer vertical cylindrical surface 92 of plate 100 is similarly slightly but definitely spaced away from the inner cylindrical surface 99 of wall portion 91. Annular brake shoe 100 is located between the bottom of shoulder 82 and top of element 85.

Plate 101 is of the same size and shape as plate 100 and forms the same fit with elements 91 and 81 as does plate 100.

Each of the springs as 96A located in its recess as 94A in the portion 93 presses against the plate 85 firmly yet in a quantitatively predetermined manner to allow a definite but not unlimited slip between units 80 and 69.

The housing cover 117 of drive unit 61 has firmly affixed to the top thereof a fixed detent plate assembly 105; assembly 105 comprises a series of like fixed wedge-shaped detent elements, as 105, 106, 107, 108, 109, which are arranged in circular fashion in a circle the center of which lies on the central longitudinal axes of shaft 26. Each detent as 104 has an upper sloped face indicated by additional characterizing referent A as 104A and 108A (on 104 and 108 respectively) and a vertical face, indicated by a characterizing referent B, as 104B, 106B, for member 104 and 106 respectively: these are shown in FIGS. 8 and 10. The center of each upper sloped detent face as 104A, lies under the center of the circle which passes through the center lines of holes as 95A, 95B, 95C and which center lines are coaxial with the center lines of the pins as 971, 979, 973 respectively that are slidably located in such holes.

Each of the array of locking plungers as 971, through 979 in the array 97 of such plungers or pins move freely in their holes in unit 93 and move freely upwardly along the sloped faces of each detent during counterclockwise rotation (as seen from above) of assembly 62 and then fall freely downward to the spaces as 104C between such elements as 104 and 106. One of the pins as 971 through 979 engages the vertical portion as 104A of a detent as 104 when the unit 62 moves clockwise (as seen from above) a very small angle.

In operation of the apparatus and system 60, the motor 64 drives the shaft 123 which in turn, through the gears 122 and 121, drives the shaft 26; shaft 26 is operatively attached to the blades, as 41, 42, 43 and 44, of the pump impeller 24; the blades force the water, 9, up through the conduit (discharge line 20) therefor to the distributing system of which the line 65 forms a part. The pressure in the line 65 at the discharge point as 68 will be between 40 and 150 pounds p.s.i. Accordingly, the force against the blades of the impeller 24 is substantial, especially at greater well depths.

During this operation the force exerted by the gear 121 causes a substantial distortion of the shaft 26. FIGS. 2 through 5 diagrammatically illustrate this action, the consequences thereof, and some aspects of the preventive action of the combination of elements as herein provided. FIG. 2 shows the shaft 26 with a radial line 141 at its top surface, 144; line 141 parallels the diameter which passes through the center of a diametrically opposed pair of impeller blades 41 and 43 (42 and 44 are not shown in this diagrammatical representation, for purposes of clarity, in FIGS. 2 through 5). A vertical line, 142, in the outer surface of shaft 26 joins the lateral edge of the line 141 and the center of impeller blade 41 on the central portion of that blade whereat that blade 41 is attached to the shaft 26. FIG. 2 shows the shaft 26 in its static position when no net stress is being applied thereto through the motor 64 or by the water column in discharge line 20. When the motor 64 begins its operation the column of water above the impeller 24 offers some resistance to the motion of impeller 24; continued forceful rotation of the shaft 26 by the motor 64 through the train of mechanical elements (e.g. shaft 123, gears 122 and 121) connecting the assembly 27 and the motor 64 applies torque to the shaft 26 continuously to discharge the water 9 from the well 12 through lines 20 and 65 to an apparatus as 68 to the fields as 67, with the pressure at an apparatus as 68 being in excess of 50 pounds p.s.i. The below calculation of the torque and the horsepower input, which is exemplary for the system 60, indicates quantitatively the amount of distortion produced in a system where a 150 horsepower is applied to a 500 ft. deep well through a shaft of 2-inch diameter.

$$\text{As } \theta = \frac{TL}{E_s J} \text{ and } T = 63.030 \frac{H}{n} \text{ where}$$

$\theta$ = angle in radians between line 141 and straight line between blades 41 and 43 in the dynamic operating equilibrium position shown in FIGURE 3; and
$L$ = length of shaft 26 in inches;
$E_s$ = shearing modulus of elasticity of the material;
$T$ = twisting moment, lb.-in.;
$J = \frac{\pi r^4}{2}$; diameter of shaft 26 is $\approx 2$ inches; value of $E_s$ (steel) = 12,000,000;
$H$ = horsepower transmitted
$n$ = r.p.m. (= 1,750 r.p.m. $\approx$ 1,500)

$$\theta = \left\{ \frac{\frac{63,030 \times 150}{\approx 1,500} \times [500 \times 12]}{12,000,000 \times \frac{\pi}{2} \times .32} \right\} = \left\{ \frac{[6.3 \times 10^3] \times [6 \times 10^3]}{[12 \times 10^6] \times \frac{\pi}{2}} \right\}$$

$$= \frac{6.3}{\pi} \approx 2 \text{ radians } [=110°].$$

At $d = 1\frac{1}{2}''$; $J = \frac{1}{2} \pi [.32]$; $\theta = 5.4$ radians [310°]
At $d = 1\frac{1}{4}''$; $J = \frac{1}{2} \pi [.15]$; $\theta = 13.3$ radians [760°].

This angular deformation, $\theta$, is an elastic deformation and the shaft 26 is chosen to absorb such strain with only elastic deformation. Accordingly, as shown in FIG. 2 during the operation of the system 60 with water discharging from well 12 to irrigator 68 the shaft 26 is substantially, yet elastically, strained while impeller 24 is rotating at the same speed as the top of the shaft 26 during pump 27 operation.

However, instantaneous release of the energy of such elastic deformation produces instantaneously far greater forces than those that produce such elastic deformation, and the shaft 26 and operatively connected in series therewith are capable of transmitting such much larger forces with consequent damage to the other parts of the system 60 described.

Interruptions of the total operation of the system 60 are frequent, especially when moving irrigating apparatus as shown in U.S. Pat. Nos. 3,381,893; 3,281,080 and 2,726,895, which are water powered, are used on usual procedures of disconnection of such mobile water-powered irrigating apparatus as well as shutoff between shifts. When it is desired that such disconnection of the power transmitted from the motor as 64 to the impeller 24 be gradual the presence of another operator at the controls of motor 64 and communication of that operator to the operator or operators in the vicinity at the point of distribution system whereat the irrigation apparatus as 68 is located are required: coordination and cooperation between those widely spaced-apart individuals can in many, but not all instances, provide a gradual reduction of the stress between the portion of shaft 26 adjacent the impeller 24 and the portion of the shaft 26 adjacent to the means for applying torque to the top thereof, as in the neighborhood of the gear 121. Notwithstanding communication, even with presently available private radio communication such as "walkie-talkies" and close family cooperation, backfiring of gas and gasoline-powered engines and electric power failures to electric motors, which motors are used to power the shaft 123 of the above-described system, provide expectable and substantially instantaneous release of the upper portion of the shaft 26 when in position shown in FIG. 3 and, with the reaction of the water in the distribution system 65 and the water column in the discharge line 20 on the blades of the impeller 24, these blades remain in the position in which they are located at the moment of power cutoff, as shown diagrammatically in FIG. 3; at the instant of release of the torque tending to turn the upper portion of the shaft 26 in a counterclockwise direction (counterclockwise as seen from above), the resilient action of the shaft 26, (acting somewhat like a torque tube in automotive spring construction,) held at its bottom as above described, rotates at its top, as shown in FIG. 4, in a clockwise direction (clockwise as seen from above) with great force and speed. It is this resilient reaction of the shaft 26, which, absent the construction herein provided, rapidly wears out and/or ruptures conventional apparatus aimed at providing for only one-way rotation of the impeller 24 and the train of mechanical elements thereto attached (e.g. shaft 26, water-lubricated bearing components, gears 121 and 122, shaft as 123 and motor components).

It is conventional, as shown in U.S. Pat. No. 3,335,791, that electric drive motors be attached directly to the shaft (as 26) which is attached to the impeller as 24; after disconnection of the apparatus for permitting rotation of the impeller 24 in only one direction the remainder of the energy in the shaft 26 and the force of the above pump water column in the discharge line 20, as well as the elasticity of the distribution system 65, causes a very rapid forceful rotation of the blades of the impeller 24 in the clockwise direction and, also, a similar violently rapid reverse direction of the elements in the motor as 64, whether it be electric or internal combustion engine type, and such rapid reverse rotation provides severe mechanical damage to such units.

On release of the upper portion of shaft 26 from the drive element tending to rotate the upper portion of the shaft 26 (as that on which line 141 is depicted in FIG. 2) or stoppage of motor 64, or release of a clutch 63 if one is used, and stopping of forceful counterclockwise movement of unit 69, a lowered pin as 971 contacting the top of plate 117 as in FIG. 11 meets with a vertical face as 104B of a detent in array 105; the locking casing 71 is then held against clockwise motion, stationary, to the limit of strength of the pin as 971; as the brake plates 100 and 101 will yield to stress applied thereto by shaft 26, unit 69 will, only gradually, slow down motion of the annular plate 82 therepast; the limit of strength of the pins as 971 is not exceeded thereby; there is a gradual release of the upper portion of the shaft 26 and assembly 80 from the stationary locking case unit 69 of the slip clutch assembly 62; this gradual release is achieved by the continued but, because it is closely adjustable to the situation in which it is operating, controllably yielding action of the assembly 62. The yielding is accomplished in such a manner and to such a degree that the shaft 26, when it has been stressed to the position thereof that is normal during its transmittal of full horsepower from the motive source as 64 to the working tool as impeller assembly 24, (which position is diagrammatically shown in FIG. 3) only slowly but definitely overcomes the initial force of attachment between assemblies 69 and 80: that force attaching assembly 80 to the assembly 69 is much greater than the force required to maintain the motion of assembly 80 relative to the assembly 69 (and unit 61 to which assembly 69 is linked by its pins as 971—979) once such motion has begun as there is a very substantial difference between torque required for initiation of rotation of assembly 80 relative to unit 69 and the amount of force required to maintain such rotation once begun.

Accordingly, the initially great force that shaft 26 would otherwise transmit to the gear 122 and other elements on the motor side rigidly attached thereto is absorbed over the relatively large angular travel of the unit 80 relative to the smaller angular displacement required of the shaft 26 to relieve all stresses therein as, following this rapid dissipation of the extremely violent and high initial available force developed by release of the top portion of the shaft 26 from the elements exerting torque thereon in the counterclockwise direction, apparatus 62 continues to act so that the force applied to the impeller 24 by the elastic reaction of the system 65 and the hydrostatic head in the discharge line 20 is also gradually relieved. Such release permits that the shaft 26 may, as shown in FIG. 5, continue with a gradual clockwise (as seen from above) rotation at its bottom as well as top portions and so relieve the system of such stresses and permit that, when the motor source, as 64, is again initially connected to the pump impeller 24 it may then start up with a low and predictable load. Even where motor 64 slows the elastic reaction of the system the hydrostatic force maintains the strained relation of top and bottom portions in a relationship as shown in FIG. 3 for shaft 26 for several seconds; release of a standard clutch as 63 rapidly releases the top portion of shaft from its strained position when one is used.

As shown in FIGS. 8 through 10, the assembly 62 is readily disassembled for adjustment thereof; the cover 119 of the unit 61 is readily removed from unit 61 for access to and disassembling of the unit 62 by removal of bolts as 119A and 119B in grooves 119C and 119D of cover 119 respectively. While, by data set out in tables I and II a workable estimate of the proper compression needed in the springs as 94A, 94B and 94C in view of the horsepower to be applied to impeller 24 may be made prior to the initial installation of the system 60, apparatus 62 also provides for ready disassembly and ready adjustment not only for the initial installation but also for subsequent changes in capacity as more and different irrigating machines are used in the system, and reduction in force of attachment of assemblies 69 and 80 as lesser pressures are required. In today's farming operations which are performed on a large scale, these conditions of changing discharge pressure are frequently encountered, and, by the use of assembly 62, conveniently, reliably and adjustably met.

Field testing and adjustment of the apparatus 62 while in the system 60 is quickly and reliably accomplished by applying full torque to the pump 27 while the discharge outlet 22 of the discharge line 20 is closed at a valve 30 and the pressure at that point is read at the indicator 32 to achieve the dynamic equilibrium relation shown in FIG. 3; the power to unit 61 is then released to achieve release of assembly 80 from unit 69 with the calculated torque release strength of unit 62. Adjustment of unit 62 is affected by use of such a number and a strength of springs as 96A, 96B and 96C as is required to release the unit 80 from unit 69 when power is rapidly shut off, yet it rotates three to 10 full revolutions and so corrects for the release from the spring action of shaft 26 and for the elastic reaction of the system 65 as well as the head of water column above the pump 27. The calculated unit 62 strength is taken from table I or II. The apparatus 62 provides a multiplicity of locations, e.g. 94A, 94B, 94C, for a large number of springs. Not all of these locations need be filled with springs as 96A, 96B, and 96C, and each of the locations wherein a spring is located may be extremely readily adjusted, such as by the addition to the bottom thereof of a washer as 196 to the bottom of the recess as 94C in which the spring as 96C is located for the vertical adjustment of such spring. The location of flanged drive sleeve unit 80 by its pins 78 and 79 permits the hollow locking case unit 69 and the collar unit 130 to be removed as a unit from the unit 61 and shoulder 112 as shown in FIG. 9. Assembly 62, as shown in FIG. 8, permits further rapid exposure of the block portion 93 of the casing body member 71. Each of the springs in block 93 is readily manipulated without any special tools, i.e. only a hand wrench is necessary to remove the bolts as 72A and 72B. (FIG. 8 shows assembly 130 extended by springs as 96A—C).

In a preferred embodiment of system 60, the motor 64 is a 150-hp. motor, the pump 27 is located at a depth of 500 feet; without the slip clutch unit 62, pins such as 971—9 are burnt and melted, as well as that even when such does not occur there is vibration and chatter of the drive unit. The resulting failure of the prevention of clockwise rotation of the pump shaft 26 damages the usual, especially water-lubricated, bearings and the pump mechanism as well as rendering the entire pump and irrigation system inoperative; electric motors with brushes suffer brush damage on reverse rotation and motors without brushes suffer such long periods of high initial current as damage the insulation thereof; internal combustion motor gear teeth are broken. Unit 62 avoids such result.

In a preferred embodiment of apparatus 62:
Weight of unit 62 is 89 lbs.
Diameter across 71 is 10½ inches
Diameter across 130 is 6½ inches
Diameter across the interior of 91 9⅛ inches
Vertical Thickness of annulus 82 ¾ inch
Pins as 971 are 2 in. long x ¾ in. diameter steel, case-hardened to 60–65 Rockwell C.

In operation the sleeve 111 is driven in a counterclockwise direction (as seen from above) by motor 64 and the pins (as 971) ride up and down in their holds (as 95A respectively) as the casing 71 turns counterclockwise (as seen from above).

All of the springs (as 94A) develop a maximum total force of 3,640 pounds, (a range of 75—150 p.s.i. is encompassed) and a maximum torque of 8,760 ft. lbs., against the turning of shaft 26. Such can be reduced. From full speed operation of the 150 hp. motor 64 to total cutoff thereof in this slip clutch 62 allows 10 complete revolutions before the shaft 26 comes to a full stop with 1½-inch diameter of shaft 26.

TABLE I

| Spring force, pounds: | No. springs | Defl. | Theo. slip torque, in.-lbs. | Theo. force at 30" lbs. | Test Results Force at 30" | Mean slip torque | Percent of full torque 5,360 in. -lbs.) at 150 HP and 1,760 r.p.m. |
|---|---|---|---|---|---|---|---|
| 1,782 | 6 | .265 | 4,300 | | 143 135, 145, 125, 135, 135 | 4,050 | 76 |
| 2,376 | 8 | .265 | 5,700 | | 190 195, 210, 200, 205, 205 | 6,100 | 114 |
| 2,970 | 10 | .265 | 7,000 | | 233 235, 245, 240, 260, 245 | 7,350 | 137 |
| 3,640 | 10 | .325 | 8,760 | | 292 310, 315, 320, 315, 320 | 9,500 | 177 |

The slip clutch friction pads 100 and 101 are 5/32 inch thick 6⅞ inch I.D. and 9 3/32 O.D. made of asbestos with metal binder (known as JM Style 140, page 4 of Johns-Manville Friction Materials Engineering & Design Data, third edition, 1961 Bulletin FM - 57A—66.

While the assembly 62 is set at the factory to slip when the reverse torque exceeds the torque required to transmit the rated horsepower, final adjustment is made in the field after installation of the pump and its motor; such adjustment is made to obtain an amount of angular rotation of the assembly 80, with assembly 69 stationary, to the point of assembly 80 being stationery, that is at least twice and preferably about 4 ± 1 times the angular rotation required to relieve the torsion stress ($\theta$ as above calculated) in the shaft 26 during its transmittal of rated drive horsepower and, which provides that assembly 80 comes to rest preferably 2 to 5 seconds and not over 10 seconds from the time of release of tension on top of shaft 26.

The springs as 64A, 64B and 64C are chosen so that there will be seven to 10 revolutions before stopping of the shaft rotation, (as in table I herebelow) when less torque is required.

The apparatus of FIGS. 1—11 was tested using a 30-inch torque arm and the Dillon Crane Scales. Data obtained are set out in table I and used for below calculations of slip torque in unit 62 and for estimate of required spring tensions needed in springs as 96A, 96B and 96C.

Theoretical slip torque is calculated as follows: T= PNUR
Where:
T= Slip Torque
N= Number of Friction Surfaces=2
U= Coefficient of Friction=3
R= Mean Radius of gyration of shoes=4 inch
P= Spring Force in Pounds.

The spring force was varied by the number of springs used and the spring deflection. Data obtained thereon is set out in table I. Table I shows the spring force can be varied to obtain torque increments of about 400 in.-lbs. with two sets of spacers and springs. Optimum torque setting will be determined by a field test as above described.

Table II sets out another set of torque release settings for the embodiment of FIG. 12 where 25,200 pounds of torque are applied at 100 percent rated horsepower.

The apparatus 62 accordingly provides access and adjustment of the system by removal of the cover 119, nut 73, pin 134, annular cover plate 70, brake shoe plate 100, "top hat" or collar unit 130 (or 130' in case of the unit shown in FIG. 12) and brake shoe plate 101. The springs as 96A or spacers as 196 may then be added to the then exposed recesses as 94A to increase the pressure on the plates 100 and 101 or springs and spacers as 196 may be removed from the recesses to lower the pressure on shoes 100 and 101, using data as in tables I and II.

The recess spaces as 94A—C are as deep as they are wide and the springs fit therein loosely even when compressed within such recesses to a height equal to that of such recesses; preferably the recesses are deeper than they are wide and there are usually TABLE II.—SLIP CLUTCH TORQUE RELEASE SETTING
[FIGURE 12 Model]

| Number of spacers, .060" thick | Release torque, in lb. | Percent rated drive torque, 26,200 |
|---|---|---|
| Number of springs: | | |
| 8 | 0 | 19,200 | 76.2 |
| 9 | 0 | 21,600 | 85.7 |
| 10 | 0 | 24,000 | 95.2 |
| 9* | ¹9 | 25,500 | 101 |
| 12 | 0 | 28,800 | 104 |
| 10 | 0 | | |
| 2 | ¹2 } | 29,700 | 113 |
| 6 | 0 | | |
| 6 | ¹6 } | 31,500 | 125 |
| 12 | ¹12 | 34,000 | 135 |
| 6 | ¹6 | | |
| 6 | ²12 } | 36,400 | 145 |
| 12 | ²24 | 38,700 | 154 |

¹ One per hole.
² Two per hole.
*Factory set point. Springs and spacers are located symmetrically about centerline of unit 69.

four complete turns in each of the springs as 96A (as shown in FIG. 11) to avoid canting thereof.

FIG. 8 shows the movement given to the collar unit 130 by the springs therebelow when the coverplate 70 and the uppermost friction plate 100 are removed therefrom. Unit 61 is held by its base 61B firmly and stationary to the ground in system 60. Motor 64 is adjusted when energized to drive its shaft 123 in only one direction.

System 60 has elastic capacity due to the very long total length of pipe in the water distribution line 65 as well as elastic capacity in the water distribution pipe of an apparatus as 68 and especially where there are water motors therein.

In operation of the system 60 there is pressure of water in the pipeline 65 (due to operation of pump assembly 27) which line usually comprises a series of serially connected conduits, and in apparatus 68 which usually also comprises a series of pipes. When the pressure applied to line 65 by the pump assembly 27 is relieved, the theretofore elastically strained system reacts to drive water towards the blades of pump assembly 27.

As the diameter of shaft 26 may vary from 1¼ to 2 7/16 inches depending on the system in which used, in the manufacture of unit 62 the passage 133 of the sleeve 81 is only initially rough bored and is not brought to its final diameter until the diameter of the shaft 26 with which that sleeve 81 is to be used is known. The channel 133 is then formed in sleeve 81 so that shaft 26 is coaxial therewith and with sleeve 111 in view of the coaxial location provided by that fit of sleeve 81 on shaft 26, the close sliding fit of pins 78 and 79 in shoulder 112, and the close sliding fit of shoulder 112 on sleeve 111 and the firm fit provided by keys as 113 and 134. The interior surface 149 of block 93 has an annular bronze bearing 138; the interior surface 139 thereof forms a smooth sliding fit with outer surface 140 of sleeve 81 in embodiment of FIG. 11 as does bearing 136 in embodiment of FIG. 12. Bearing 136 is a reinforced plastic bearing, formed of polymerized tetrafluorethylene with silicate and a metal therein, as in U.S. Pat. No. 3,122,505, in the particular embodiment shown.

The outer vertical surface 150 of shoulder 82 is slightly but definitely spaced away from the inner cylindrical surface 99 of wall portion 91 by .003 inch to .010 inch; surface 102 of plate 100 may contact the surface 91 or the surface 102 may contact surface 103, but not both.

I claim:

1. An adjustable torque-responsive yielding clutch brake and drive unit with check of drive member comprising a drive sleeve unit, a locking unit and a cover plate;

said drive sleeve unit comprising a cylindrical drive sleeve and a peripheral drive shoulder, coaxial with said sleeve and fixedly attached to said drive sleeve;

said cover plate comprising a flat rigid plate, a circular bearing and a detent plate assembly; said detent assembly comprising a series of like wedge-shaped detent elements each comprising an upper sloped face portion and a vertical face portion, said detent elements being arranged in a circle on the face of said rigid plate and firmly fixed thereto and the center of which circle lies on the longitudinal axis of said cylindrical drive sleeve, said sloped faces all sloping in the same tangential direction relative to said longitudinal axis of said cylindrical drive sleeve, said circular bearing being coaxial with said longitudinal axis of said cylindrical drive sleeve, said axis being vertical;

said locking unit comprising a locking collar unit comprising a cylindrical locking sleeve and a peripheral locking shoulder coaxial with said sleeve and fixedly attached to said locking sleeve and a rigid annular body; a plurality of vertical channels in said body open to the bottom thereof, a rigid vertically elongated locking pin located in each of said channels slidable in direction parallel to said longitudinal axis of said drive sleeve, said locking pins being in a circular array coaxial with the axis of said annular body, said annular body and said sleeve and said circular bearing being coaxial, said body resting on said drive sleeve shoulder, said drive sleeve shoulder resting on said bearing, the centers of said vertical channels in said body lying in a circle coaxial with and of the same size as the circle on which said wedge-shaped detent elements are arranged, the members of said array of locking pins, while located in part in said channels of said body, operatively contacting said wedge-shaped elements of said detent assembly whereby to form a one-way brake therewith; and said rigid annular body also comprising a plurality of vertically extending recesses in said body open to the top thereof, a plurality of springs located in said recesses, a first annulus located above said circular array of upwardly open recesses, a first flat annular plate of friction material located above and in contact with said first annular plate, the peripheral annular locking shoulder located above and in contact with said first flat annular plate of friction material, a second flat annular plate of friction material located above and in contact with said annular locking shoulder means therebetween, the locking sleeve having an internal channel therethrough coaxial with said first annulus, and removable rigid means extending parallel to said longitudinal axis of said cylindrical drive sleeve on opposite sides of said axis between said locking sleeve and said drive sleeve shoulder whereby to hold said locking sleeve from rotating about said axis relative to said drive sleeve shoulder.

2. A unit as in claim 1 wherein one of said assembly of locking pins engages the vertical portion of one of said detents.